United States Patent Office 2,910,195
Patented Oct. 27, 1959

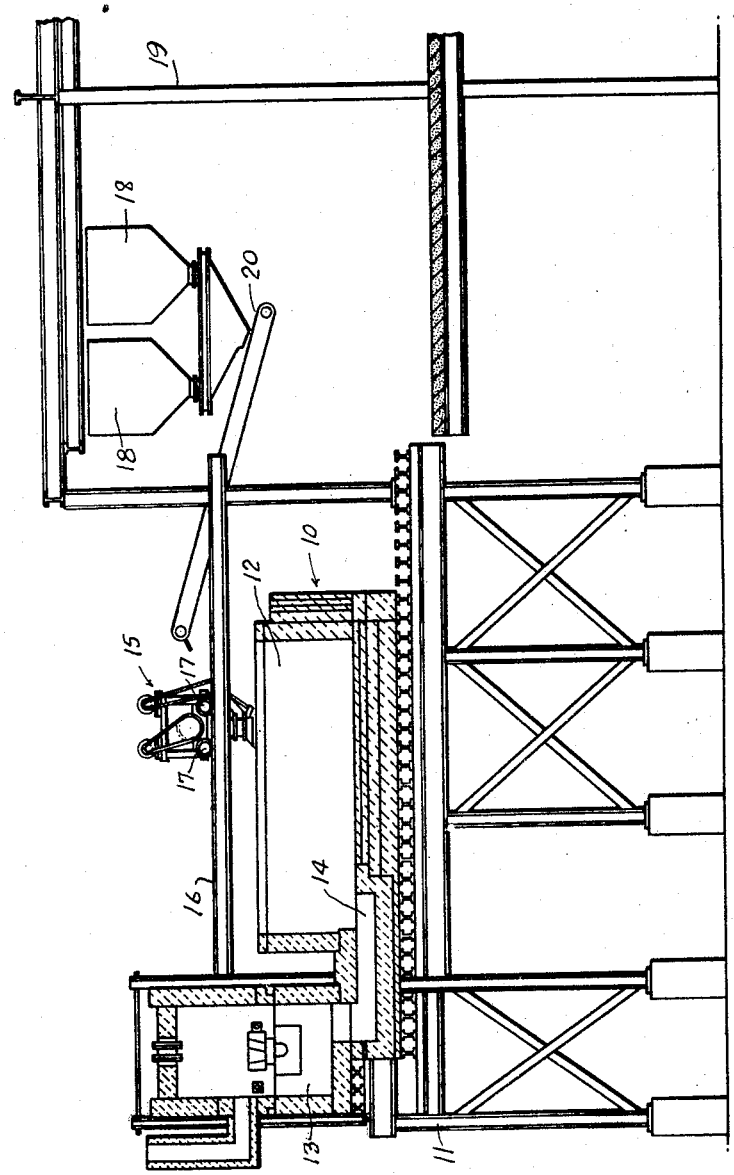

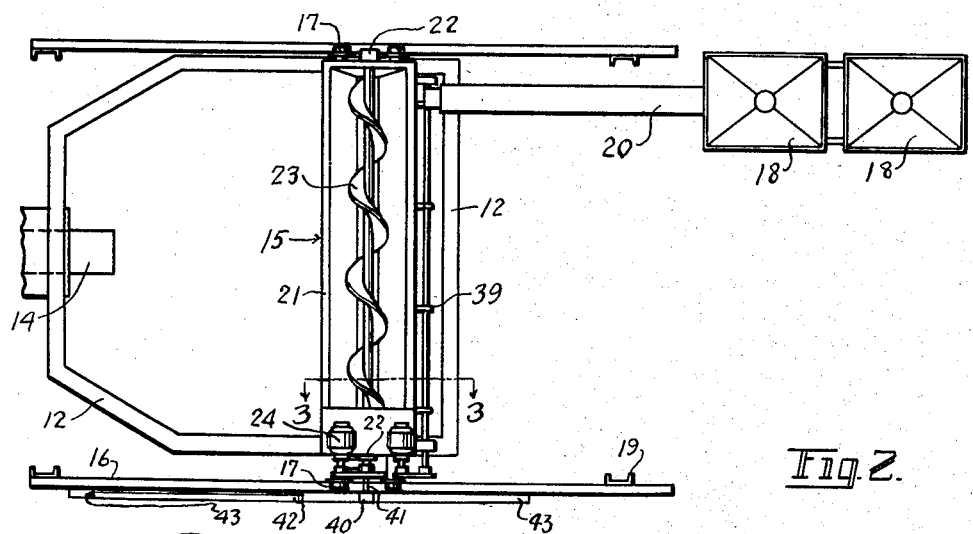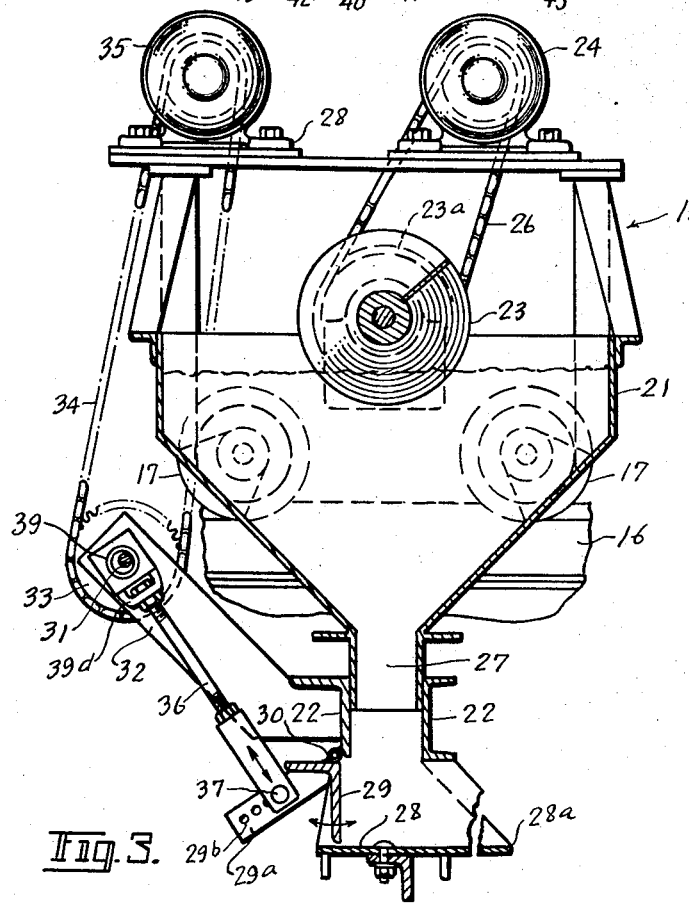

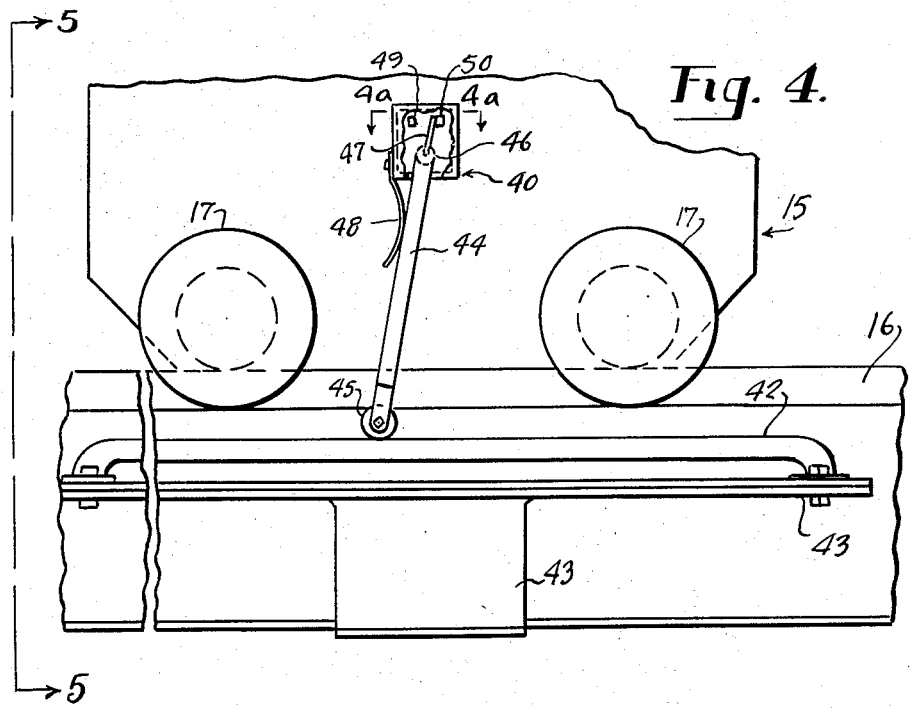
*Fig. 4.*
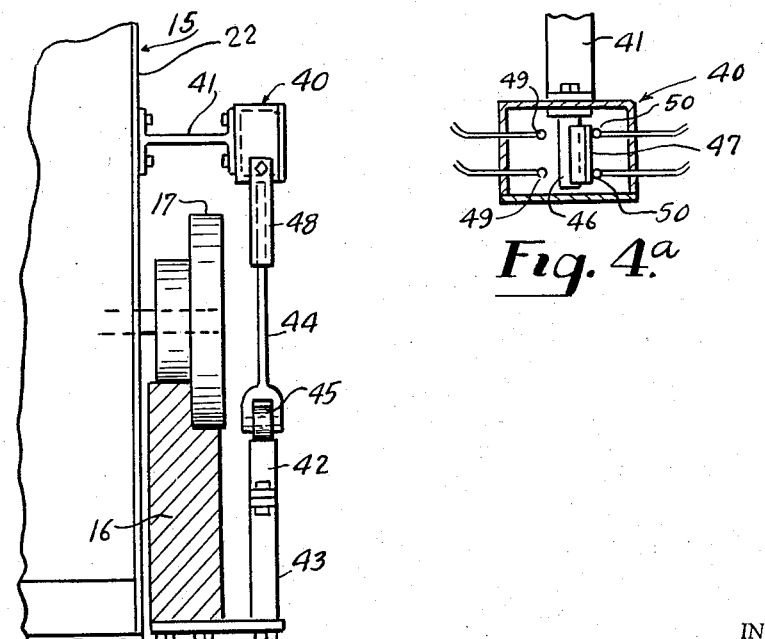
*Fig. 5.*   *Fig. 4a.*
INVENTOR.
Ralph H. Olson
BY
J. R. Nelson and
Leonard D. Soubier
ATTORNEYS

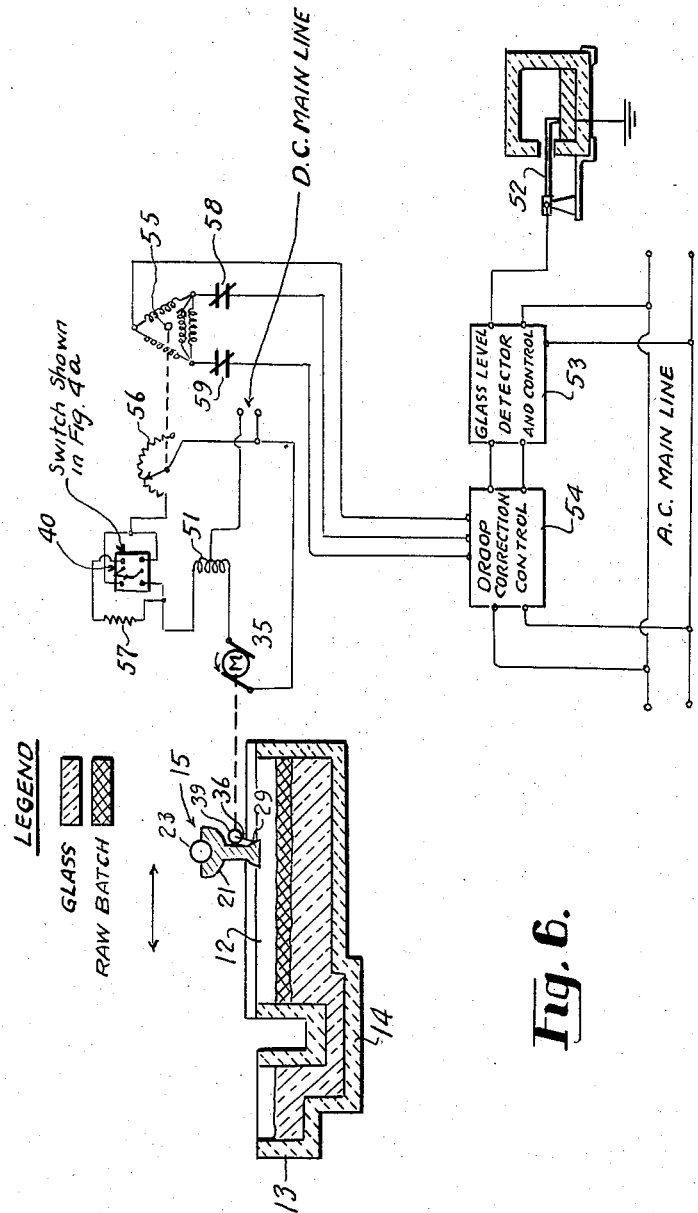

2,910,195

APPARATUS FOR BLANKET CHARGING GLASS BATCH IN A GLASS FURNACE

Ralph H. Olson, Toledo, Ohio, assignor to Owens-Illinois Glass Company, a corporation of Ohio Application December 10, 1956, Serial No. 627,354

7 Claims. (Cl. 214—18.2)

This invention relates to apparatus for blanket charging raw materials in a glass furnace, and more specifically to charging a blanket of these materials over the top of an electric open top glass melter by distributing fresh material along a top layer of batch in the melter at a variable rate to meet the demands of the furnace at all times.

The present application is related to copending application of George E. Keefer, entitled "Method and Apparatus for Blanket Charging Glass Batch in a Glass Furnace," Serial No. 627,353, filed December 10, 1956, owned by common assignee and is filed for the purpose of claiming the present invention, which incorporates an improvement for controlling the total feeding rate of the batch feeder and embodies an improved apparatus for regulating blanket charging raw batch materials to a glass melting furnace responsive to furnace demand, wherein the total distribution rate of batch along the direction of travel of the batch feeder is varied, so as to compensate for dwell time of the batch feeder during the time the traveling batch feeder is stopped to replenish the supply of batch materials in the feeder hopper from a stationary source.

A batch feeder is utilized wherein fresh batch is distributed over the top of the melting area by discharging batch from a horizontal discharge plate by reciprocating discharge assistants during back and forth travel of the batch feeder apparatus across one dimension of the melter. The batch feeder must be stopped at some point along its travel across the open top of the melter to refill its hopper with batch. If the furnace has been supplied with just enough batch to meet its demands while the batch feeder is operating, the dwell time during which it is necessary to stop the batch feeder to refill its hopper causes the quantity of batch in the melter to fall below the furnace demand level necessary to maintain the proper level of working glass in the feeder during this interruption of operation of the batch feeder.

Furthermore, in varying the total batch feeding rate during travel of the batch feeder, the furnace demand is detected and relayed by a glass level detector and control device. Over wide variations in demand, such a control device tends to "hunt" for the proper feeding rate of the feeder to supply batch to satisfy the proper level of glass in the working zone of the furnace.

It is, therefore, an object of this invention to provide apparatus for blanket charging batch material to the melting zone of an open top glass furnace, wherein a predetermined excessive quantity of batch, above that of the proper operating furnace demand, is distributed over a portion of the top area of the melter to compensate for the loss of feed during interruption in feeding to refill the batch feeder hopper.

Another object of invention is to provide apparatus for blanket charging batch to an open top glass melter, wherein the rate of feeding batch is variable across both dimensions of the melter.

Another object of this invention is to provide apparatus for blanket charging batch materials to the melter, wherein the batch feeding rate is controlled as an average of the demands of the furnace and, in so doing, will reduce "hunting" in the total batch feed rate control so as not to overcontrol said rate to adjust to variations in furnace demand.

The specific nature of the invention, as well as other objects and advantages thereof, will become apparent to those skilled in the art from the following detailed description, taken in conjunction with the annexed sheet of drawings on which, by way of preferred example only, is illustrated a preferred embodiment of this invention.

In the drawings:

Fig. 1 is a side elevational view of a glass melting furnace on which the improved batch feeder apparatus of this invention is employed.

Fig. 2 is a plan view of the batch feeder in operating position over the top of the melter.

Fig. 3 is a sectional end elevational view of the batch feeder taken along lines 3—3 of Fig. 2.

Fig. 4 is a fragmentary end elevational view of the batch feeder shown in Fig. 3, and including switch mechanism for energizing the overriding control circuit at predetermined positions of the batch feeder along a portion of its path of travel across the melter.

Fig. 4A is a top view of the overriding control circuit switch.

Fig. 5 is a partial side view of the feeder apparatus, shown in operating position on the tracks and including the cam rail and cam for closing the overriding control circuit switch.

Fig. 6 is a schematic view, showing the electrical control circuits for varying the speed of the discharge drive motor as a function of furnace demand, and including an overriding control circuit for increasing the speed of the motor over that set by the furnace demand control.

The operation of the apparatus of this invention consists, generally, in supporting a body of batch materials in a feeder hopper which is supported to extend across one dimension of the glass melting zone of an open top glass melting furnace. The body of batch is traveled, at a uniform rate, back and forth across the other dimension of the melter while feeding the batch therefrom at a rate which varies along the longitudinal dimension of the batch feeder, and thereby depositing a blanket of batch in the melter. The feeding rate is adjusted to vary along the longitudinal dimension of the hopper to vary the depth of the batch blanket between the central and side zones of the melter. The total rate of feeding the batch is controlled while the batch feeder travels from one extremity of the melter to the other, so as to vary this total feeding rate as a function of the furnace demand. Any variation in furnace demand is relayed to vary the total batch feeding rate by means of a glass level detector and control device which makes the proper adjustment in the speed of the batch feed drive. In this manner, the batch feeder always supplies enough batch to the melter to meet furnace requirements, so that a desired level of molten glass is maintained above the feed point in the glass working zone of the furnace. However, this may only be accomplished while the batch feeder is operating, and since it is necessary to periodically stop the batch feeder's travel and interrupt its operation in order to replenish the body of batch material carried by the hopper, the level of the blanket carried by the melter lags behind furnace demand. When the batch feeder is again put into operation after refilling, the demand for batch has increased to a point where the glass level control calls for a sharp feeding rate increase. In order for the batch feeder to again catch up with the furnace demand level, the glass level detector adjusts the batch rate to vary through wide ranges oscillating over and under the rate for desired operating level in a manner of "hunting." The "hunting" may add batch to the blanket in a manner so as to vary the working glass level in the working zone of the furnace to cause significant variations in working glass gob size and ultimately affect the quality of the ware being produced therefrom. To compensate for the pause in operation for refilling the batch feeder hopper, and to decrease the "hunting" effect of the total feed rate controls after the batch feeder returns to operation, this invention contemplates increasing the total feeding rate above that corresponding to furnace demand during a portion of the travel of the batch feeder and thereby supply an excess of batch to a portion of the blanket above that normally demanded by the furnace during that time. This excess is controlled to equal the quantity of batch that is melted during the pause for hopper refill, so that when the batch feeder resumes operation the level of the batch blanket will approximately equal the then current furnace demand level. By including a droop correction control device connected responsive to the glass level detector and control device, the demand variations of the furnace that may occur during operation of the batch feeder will be averaged by the droop correction control to reduce the "hunting" effect of the glass level control in relaying adjustments to the batch feeding rate.

Turning now to the figures, Fig. 1 illustrates a conventional open top glass furnace referred to generally at 10, supported on a structural base 11, and comprises a melter chamber 12 communicating with a refiner chamber 13 through a submerged throat passage 14. A feeder hopper assembly 15 is supported on tracks 16 over the top of melter 12 and assembly 15 is adapted for movement longitudinally of melter 12 on rollers 17 traveling along tracks 16. Rollers 17 are propelled along tracks 16 by a conventional constant speed device (not shown), which reverses direction at each longitudinal end of melter 12. It is timed to stop or dewell periodically at the end of melter 12 opposite throat passage 14, and there load the hopper of assembly 15 from a supply of batch. Spaced from the outer end wall of melter 12 are batch bins 18 supported on structural columns 19. Bins 18 are utilized to store raw batch materials for transfer to feeder hopper assembly 15 by conveyor 20. The hopper of assembly 15 is loaded while stationary at its extremity of travel to the right hand side of Fig. 1.

Referring now to Figs. 2 and 3, it is seen that the feeder hopper assembly 15 comprises an elongated funnel-shaped hopper 21 supported by a frame 22 mounted on rollers 17. Longitudinally of the hopper 21 is a screw element 23 mounted for rotation therein. An electric motor 24 is mounted on a bracket 25 at one end of hopper frame 22, and drives screw 23 through belt 26 and pulley 23a to distribute the batch uniformly throughout the length of hopper 21.

The lower funnel portion of hopper 21 is housed between longitudinal members of frame 22 and has a discharge opening 27 (Fig. 3) to permit gravity feeding of batch material contained in hopper 21 onto an elongated discharge lip member 28 rigidly mounted on frame 22 below discharge opening 27. Discharge lip member 28 receives and supports batch material in hopper 21 and has sufficient width, so that, as batch material is discharged from hopper 21 onto lip 28, the angle of repose of the batch supported thereon will prevent the batch from spilling over the discharge extremity 28a of lip member 28. Along the one longitudinal edge of lip member 28 is mounted a plurality of discharge assistants for moving batch off of lip member 28.

As shown, these discharge assistants are illustrated as a plurality of reciprocating blade elements 29 pivoted about a longitudinal pivot axis 30 overlying lip member 28 and along the side at the lower end of discharge opening 27 of hopper 21. A lever arm extension 29a is provided integral on each of blade members 29 and extends outwardly of opening 27. Shaft 31 is journaled at its ends in brackets 32 mounted on hopper frame 22 so that it is parallel to and overlying blade members 29. Pulley 33 is keyed to the end of shaft 31 for imparting rotation transmitted from a variable spaced D.C. motor 35 and belt 34. Motor 35 is mounted on frame 22 by bracket 38. The variable speed feature of motor 35 is utilized to vary the total feeding rate of the discharge assistants, which will be hereinafter described more fully. A plurality of connecting rods 36 are each pivoted at one end on pins 37 in their respective lever arms 29a of blade members 29 at pins 37. Pins 37 are carried in any selected hole 29b of a series of such holes along each lever arm 29a, and are readily removable for adjusting the connection of connecting rod 36 to lever arm 29a. The other end of connecting rod 36 is provided with an eccentric bearing member 39 clamped about shaft 31 and threaded onto the end of connecting rod 36 at U-clamp 39a. Connecting rod 36 has a threaded adjustment to adjust its length when changing the lower connection to lever arm 29a between holes 29b. Likewise, the throw of the eccentrics are adjustable by providing eccentric bearing members 39 of various sizes, which may be easily interchanged by threading and unthreading at U-clamp 39a.

During operation of the feeder hopper assembly 15, motor 35 drives shaft 31 in one direction. The rotation at shaft 31 is converted to reciprocal motion at blade member 29 through the action of eccentric 39 and connecting rod 36 on lever arm 29a. The length of stroke of the reciprocating motion of a given blade member 29 is adjustable by varying its point of connection to connecting rod 36 along the length of its lever arm 29a or by changing the through of eccentric 39, or both.

In the figures is shown an arrangement of four driving connections 39, 36 and 37 for reciprocating blade members 29. It is contemplated by this invention that the blade members 29 may be individually varied in length of stroke, thereby varying one from the other the effective rate of discharging batch material from lip member 28.

In Fig. 4, a double pole double throw control switch assembly 40 is mounted on bracket 41 fastened to the side of hopper frame 22 and overlies cam track 42. A cam track support member 43 is rigidly connected longitudinally along the bottom of track 16. Cam arm 44 is rotatable about pivot pin 46 in switch assembly 40 and carries a rotatable cam roller 45 at the lower end thereof. The upper end of cam arm 44 carries a transverse electrical contact bar 47. Leaf spring 48 is attached at one end on switch assembly 40 and lies along cam arm 44 to bear against it. Spring 48 normally holds cam arm 44 so that its contactor bar 47 makes an electrical connection across terminals 49 of switch 40 (Figs. 4A and 6) and normally close only the field circuit of variable speed D.C. motor 35. However, during a portion of the travel of hopper assembly 15 away from throat outlet 14 (to the right in Fig. 4) cam arm 44 is pivoted, against the force of spring 48, by cam 45 engaging cam track 42 along its length and contactor bar 47 is shifted to make an electrical connection across terminals 50 of switch 40 (Figs. 4A and 6) to connect the overriding control circuit in series with the field circuit of motor 35, and thereby increase the speed of the motor by connecting a predetermined amount of electrical resistance in series with the field windings 51 of motor 35.

In operation of the apparatus of the invention, feeder hopper assembly 15 is reciprocally moved back and forth across one dimension of the furnace. During this time, motor 35 imparts reciprocating motion to blade members 29 to move batch material deposited on discharge lip member 28 over its discharge extremity 28a and lay a curtain of batch over the top of the melter. Along the length of discharge lip member 28 these discharge assistants (blade members 29) are feeding batch at a varying rate determined by the variable length of reciprocating stroke of blade members 29.

The total batch laying rate of the system may be controlled to the demands of the furnace by varying the speed of motor 35, which drives all of the discharge assistants 29. This is accomplished through the control circuits for motor 35, shown schematically in Fig. 6.

A conventional glass level probe 52 is mounted in the furnace forehearth and connected electrically to a glass level detector and control device 53 of the type shown and described in U.S. Patent No. 2,613,443 to M. A. Helmick, entitled "Glass Level Recording Mechanism." Glass level device 53 is connected in series with a conventional automatic reset device or droop correction control 54. A.C. motor 55 which has an operative connection to adjust the setting of rheostat 56, is electrically connected with the droop correction control device 54 to rotate between limits defined by limit switches 58 and 59 and adjust the setting up or down of rheostat 56, thereby increasing or decreasing, respectively, its amount of resistance in the field circuit of motor 35. Variable rheostat 56 is normally connected across terminals 49 by the normal setting of switch 40, which connects it in series with the field windings 51 of motor 35. Power is applied to glass level detector device 53 and droop correction control device 54 from main supply lines of an alternating current system. Power is applied to variable speed D.C. motor 35 from main supply lines of a direct current system.

The glass level probe 52 determines the glass level needs of the furnace forehearth. When the glass level rises to normal or above, the glass level detector device 53 initiates an adjustment of variable rheostat 56 through motor 55 to appropriately decrease the field resistance and thereby decrease the speed of motor 35, and conversely, when the glass level falls below normal, the glass level detector device 53 initiates an adjustment of rheostat 56 through motor 55 to appropriately increase the field resistance and thereby increase the speed of motor 35. The droop correction control device 54 monitors these demand signals given by the glass level detector 52—53 and averages them so as to reduce the "hunting" effect of the motor controls as glass demands vary.

As previously mentioned, this circuit is normally connected to motor field windings 51 through connection at terminals 49, however, on a portion of the travel of hopper assembly 15 away from melter throat outlet 14, the throw of switch 40 is reversed by cam 45 engaging cam track 42. Switch 40 is then set to electrically connect the terminals 50 and connect the resistance 57 of an overriding control circuit in series with variable resistance 56 and field windings 51. Up to this point, the speed of motor 35 has been controlled to feed batch as the furnace level variations demanded, but during the time the resistance 57 is connected to field windings 51 the speed of motor 35 is increased over its speed, as determined by furnace demand. Accordingly, an excess of batch above the corresponding furnace demand is laid over that portion of movement of hopper assembly 15 away from throat outlet 14 during which time cam 45 is engaged on cam track 42. Since the level of glass in the forehearth will then rise above normal, the droop correction device 54 will take over exclusive control of the feeding rate control when resistance 57 is again disconnected, and the feeding rate will be decreased during the remainder of the travel of hopper assembly 15 in that direction. Since the droop correction device averages the demands over a cycle of travel, the total batch feeding rate will be decreased below the corresponding furnace demand until the excess batch is melted to restore the system to balance. During part of the time the system is returning to balance, the hopper assembly comes to rest at the end of melter 10 and hopper 21 is refilled. Thus, the excess batch laid over a portion of the travel to the refill station compensates for the lost batch feeding time while the batch feeder is stopped for refilling.

It is contemplated in this invention that this excess in batch being applied may be varied in two dimensions. First, the length of the span over which it is applied may be varied by providing a telescopically adjustable length of cam track 42 which may be lengthened or shortened by repositioning its end mounting position along its support member 43 (Figs. 4 and 5). And second, the depth at which the excess of batch is applied over this span may be varied by increasing or decreasing the amount of the resistance 57 in the overriding control circuit.

Also, the span of travel of hopper assembly 15 and point at which the excess of batch is to be applied may vary by varying the location of any selected length of cam track 42, or by installing a plurality of spaced cam track sections over selected spans. For sake of simplicity of illustration, however, only a single length of cam track 42 is shown in the figures.

It will, of course, be understood that various details of construction may be modified through a wide range without departing from the principles of this invention, and it is, therefore, not the purpose to limit the patent granted hereon otherwise than necessitated by the scope of the appended claims.

I claim:

1. A batch feeder for a glass furnace comprising a hopper extending across the top of said furnace, means at the bottom of said hopper defining an elongated discharge opening extending across one horizontal dimension of said furnace, means mounting said hopper for movement along the other horizontal dimension of said furnace, a plurality of drivable discharge assistants cooperating with said discharge opening to control the feed of batch therethrough, each of said discharge assistants having two independently variable characteristics determining its batch feeding effectiveness, means for individually varying one of said characteristics of each of said discharge assistants to modify the batch feeding rate across said one horizontal dimension of said furnace, a variable speed driving means operatively connected to drive said discharge assistants for collectively varying the other said characteristic of all said discharge assistants, a first control means for varying the speed of said driving means responsive to the level of molten glass in said furnace, and second control means cooperating with said first control means for modifying the speed of said driving means a predetermined amount as a function of the position of said hopper relative to said other horizontal dimension of said furnace.

2. A batch feeder for a glass furnace comprising a hopper extending across the top of said furnace, means at the bottom of said hopper defining an elongated discharge opening extending across one horizontal dimension of said furnace, means mounting said hopper for movement along the other horizontal dimension of said furnace, a plurality of drivable discharge assistants cooperating with said discharge opening to control the feed of batch therethrough, each of said discharge assistants having two independently variable characteristics determining its batch feeding effectiveness, means for individually varying one of said characteristics of each of said discharge assistants to modify the batch feeding rate across said one horizontal dimension of said furnace, a variable speed electric motor for collectively varying the other said characteristic of all said discharge assistants, a first control circuit for energizing said motor in response to the level of molten glass in said furnace, and an overriding control circuit for modifying the energization of said motor as a function of the position of said hopper relative to said other horizontal dimension of said furnace.

3. The combination defined in claim 2, wherein the overriding control circuit increases the energization of said motor during a portion of the movement of said hopper along said other horizontal dimension of the furnace.

4. The combination defined in claim 2, wherein additionally the first control circuit includes a droop correction control device in circuit with a glass level control device, the latter being operable to increase and decrease alternatively the speed of said variable speed electric motor correspondingly to the demands of the furnace for batch.

5. A batch feeder for a glass furnace comprising a hopper extending across the top of said furnace, means at the bottom of said hopper defining an elongated discharge opening extending across one horizontal dimension of said furnace, means mounting said hopper for movement along the other horizontal dimension of said furnace, a plurality of drivable discharge assistants cooperating with said discharge opening to control the feed of batch therethrough, each of said discharge assistants having two independently variable characteristics determining its batch feeding effectiveness, means for individually varying one of said characteristics of each of said discharge assistants to modify the batch feeding rate across said one horizontal dimension of said furnace, a variable speed electric motor driving said discharge assistants and adaptable for collectively varying the other said characteristic of all said discharge assistants, and a first control circuit for energizing said motor in response to the level of molten glass in said furnace.

6. A batch feeder for a glass furnace comprising a hopper extending across the top of said furnace, means at the bottom of said hopper defining an elongated discharge opening extending across one horizontal dimension of said furnace, means mounting said hopper for movement along the other horizontal dimension of said furnace, a plurality of drivable discharge assistants cooperating with said discharge opening to control the feed of batch therethrough, each of said discharge assistants having two independently variable characteristics determining its batch feeding effectiveness, means for individually varying one of said characteristics of each of said discharge assistants to modify the batch feeding rate across said one horizontal dimension of said furnace, a variable speed electric motor driving said discharge assistants and adaptable for collectively varying the other said characteristic of all said discharge assistants, and a first control circuit for energizing said motor in response to the level of molten glass in said furnace, said control circuit including electrically operated means for varying the field resistance of said electric motor to thereby vary its speed accordingly, and a droop correction control device and glass level control device in circuit with said last mentioned means for operating said means responsive to levels of molten glass in the forehearth of the furnace correspondingly for increasing or decreasing motor speed whenever the said glass level in the forehearth deviates from an established operating level therein.

7. The subcombination in a batch feeder for a glass furnace comprising means for discharging batch into the furnace, driveable means cooperating with said last-mentioned means to control the discharge of batch to said furnace, a variable speed driving means operatively connected to drive said driveable means, and a control means connected for varying the speed of said driving means responsive to the level of molten glass in said furnace, said control means including a glass level control device and a droop correction control device in circuit with each other, the former device being operable for alternatively initiating increases and decreases in the speed of said driving means according to changes in demand by the furnace for batch as determined by changes in the molten glass level in said furnace, and the latter device operating for averaging such changes in demand effecting variation in speed of said driving means in accordance therewith to reduce hunting in said increases and decreases in speed of the driving means.

References Cited in the file of this patent

UNITED STATES PATENTS

| | | |
|---|---|---|
| 2,175,541 | Probert | Oct. 10, 1939 |
| 2,241,310 | Krale | May 6, 1941 |
| 2,306,811 | Kennedy | Dec. 29, 1942 |
| 2,711,837 | Henry et al. | July 28, 1955 |